US 7,756,362 B2

(12) United States Patent
Nakase et al.

(10) Patent No.: US 7,756,362 B2
(45) Date of Patent: Jul. 13, 2010

(54) IMAGE PROCESSING APPARATUS, CONTROL METHOD THEREFOR, COMPUTER PROGRAM, AND COMPUTER-READABLE STORAGE MEDIUM

(75) Inventors: Yuichi Nakase, Tokyo (JP); Hiroaki Yoshino, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1133 days.

(21) Appl. No.: 11/332,316

(22) Filed: Jan. 17, 2006

(65) Prior Publication Data
US 2006/0173918 A1 Aug. 3, 2006

(30) Foreign Application Priority Data
Jan. 28, 2005 (JP) ............................. 2005-021821
Feb. 16, 2005 (JP) ............................. 2005-039521

(51) Int. Cl.
*G06K 9/40* (2006.01)
*G06F 7/00* (2006.01)
(52) U.S. Cl. .................................... 382/305; 707/104.1
(58) Field of Classification Search ................ 382/282, 382/291, 305, 312; 707/1, 104.1, 205; 711/100
See application file for complete search history.

(56) References Cited

U.S. PATENT DOCUMENTS

| 5,883,623 | A | | 3/1999 | Cseri |
| 6,470,413 | B1 | * | 10/2002 | Ogawa ........................ 711/103 |
| 6,556,713 | B2 | * | 4/2003 | Kobayashi et al. ........... 382/224 |
| 7,055,106 | B2 | * | 5/2006 | Shibata ........................ 715/837 |
| 7,072,878 | B2 | | 7/2006 | Kotani |
| 7,495,793 | B2 | | 2/2009 | Kojima et al. |
| 7,600,191 | B2 | | 10/2009 | Yoshikawa et al. |
| 2002/0184249 | A1 | * | 12/2002 | Shibata ........................ 707/204 |
| 2003/0131019 | A1 | * | 7/2003 | Kobayashi et al. ........ 707/104.1 |

(Continued)

FOREIGN PATENT DOCUMENTS

JP 10091634 A 4/1998

(Continued)

OTHER PUBLICATIONS

Chinese Office Action dated Oct. 31, 2008 in corresponding Chinese Application No. 2006100017737, and English language translation thereof.

(Continued)

*Primary Examiner*—Kanji Patel
(74) *Attorney, Agent, or Firm*—Fitzpatrick, Cella, Harper & Scinto

(57) ABSTRACT

In this invention, when images, in image files managed according to photographing dates, which match a search condition are to be displayed, the images matching the search condition are sequentially displayed such that the positions or distribution of the image files, of all image files, which match the search condition can be checked. For this reason, when the search condition is changed by operating upper and lower keys provided on the back face of a digital camera, a search is made for images matching the condition after the change. Indicators indicating the relative positions of the images matching the search condition in the list of image files arranged in the order of photographing dates are displayed. When the left and right keys are operated, one of images matching the search condition is displayed in the image display area.

17 Claims, 18 Drawing Sheets

U.S. PATENT DOCUMENTS

2003/0158838 A1\* 8/2003 Okusa .......................... 707/1
2007/0014543 A1   1/2007 Nakase et al. ............... 386/107

FOREIGN PATENT DOCUMENTS

| | | |
|---|---|---|
| JP | 2003-199028 | 7/2003 |
| JP | 2004-112708 | 4/2004 |
| JP | 2004152239 A | 5/2004 |
| WO | 02/057959 | 7/2002 |

OTHER PUBLICATIONS

Japanese Office Action dated Aug. 24, 2009 in corresponding Japanese Application No. 2005-039521.

\* cited by examiner

FIG. 7

| INDEX | DISPLAY CHARACTER STRING | SEARCH TARGET |
|---|---|---|
| 1 | Date | ALL IMAGES |
| 2 | Movie | MOVING IMAGE |
| 3 | Auto | ALL STILL IMAGES |
| 4 | Macro | STILL IMAGE (MACRO) |
| 5 | Portrait | STILL IMAGE (PORTRAIT) |
| 6 | Snap | STILL IMAGE (SNAP) |
| 7 | Scenery | STILL IMAGE (DISTANCE VIEW) |
| 8 | Protect | PROTECTED IMAGE |

FIG. 13

| INDEX | DISPLAY CHARACTER STRING | SEARCH TARGET |
|---|---|---|
| 1 | Date | ALL IMAGES |
| 2 | Movie | MOVING IMAGE |
| 3 | Auto | ALL STILL IMAGES |
| 4 | Macro | STILL IMAGE (MACRO) |
| 5 | Portrait | STILL IMAGE (PORTRAIT) |
| 6 | Snap | STILL IMAGE (SNAP) |
| 7 | Scenery | STILL IMAGE (DISTANCE VIEW) |
| 8 | Protect | PROTECTED IMAGE |
| 9 | Day | ALL IMAGES |
| 10 | Month | ALL IMAGES |

IMAGE PROCESSING APPARATUS, CONTROL METHOD THEREFOR, COMPUTER PROGRAM, AND COMPUTER-READABLE STORAGE MEDIUM

FIELD OF THE INVENTION

The present invention relates to a technique of searching for sensed images and displaying them.

BACKGROUND OF THE INVENTION

In general, a digital camera has a function of storing images, obtained by image sensing by an image sensing device, into a detachable storage medium such as a memory card and a display unit for displaying a menu for the user to check sensed images, delete desired images, and make various kinds of settings. Recent digital cameras have a function of recording not only still images but also moving images.

Recently, as the memory capacity of a storage medium has increased, many images can be recorded. This makes it necessary to provide some means for finding images desired by the user from many images. Japanese Patent Laid-Open No. 2004-112708 discloses such a digital camera having the function of allowing the user to search for a desired image file from many image files.

There is also available a technique of preparing a hierarchical menu for a display unit, classifying images according to photographing dates or the like, and allowing the user to browse images for each classification unit. This technique is disclosed by, for example, Japanese Patent Laid-Open No. 2003-199028.

In general, portability is required for a digital camera, and hence the number of operable switches (including buttons) is about 10 at most. Using these switches and the menu on the display unit allows the camera to have functions larger in number than the switches. In performing the above image search, several operations are required to issue an instruction to make a search with a photographing date as a search item. In order to set another kind of data as a search key instead of a photographing date, it is necessary to trace back from the top menu to the corresponding search menu, resulting in complicated operation.

SUMMARY OF THE INVENTION

The present invention has been made in consideration of the above problems, and has as its object to provide a technique in which when images, in image files managed according to order information such as photographing dates or index numbers, which match a search condition are to be displayed, the images matching the search condition are sequentially displayed in such a manner that the positions or distribution of image files, of all the image files, which match the search condition can be checked.

In order to achieve this object, an image processing apparatus according to the present invention has the following arrangement.

That is, there is provided an image processing apparatus which displays an image matching a set search condition from a storage device storing a plurality of image files associated with file order information, comprising:

indicator display means for displaying indicators indicating relative positions of images matching the search condition in a list of the plurality of image files specified by the file order information;

image display means for displaying one image matching the search condition; and image switching means for displaying, in place of the displayed image, an image which is located at an ordinal position after or before the displayed image and matches the search condition in response to a predetermined instruction input.

According to another aspect of the present invention, there is provided an information search apparatus which searches for a predetermined search target in a search area, comprising:

search target presence/absence management means for managing search target presence/absence information indicating whether a search target exists in the search area;

search target information management means for managing search target information in the search area;

determination means for determining on the basis of the search target presence/absence information whether a search target exists in the search area; and search means for searching for a search target on the basis of the search target information when the determination means determines that there is a search target.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a view showing a search condition table in this embodiment;

FIG. 13 is a view showing a search condition table in the second embodiment;

DETAILED DESCRIPTION OF THE PREFERRED EMBODIMENTS

The embodiments of the present invention will be described in detail below with reference to the accompanying drawings.

<Explanation of Apparatus Arrangement>

Figure 1:
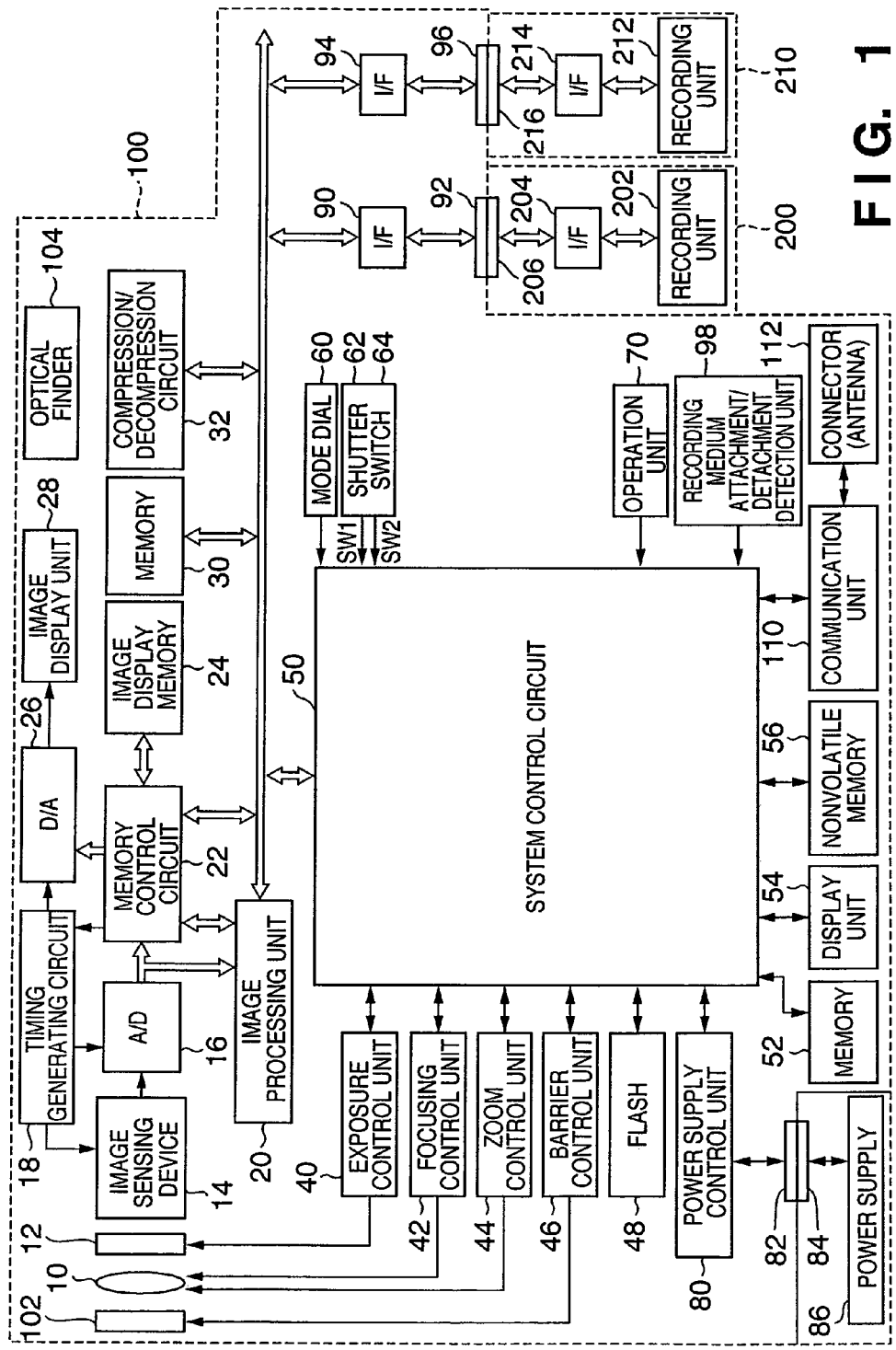
FIG. 1 is a block diagram showing the arrangement of a digital camera according to an embodiment.

FIG. 1 is a block diagram showing the arrangement of a digital camera 100 according to an embodiment.

Referring to FIG. 1, reference numeral 100 denotes the digital camera; 10, a photographing lens; 12, a shutter having a stop function; 14, an image sensing device which converts an optical image into an electrical signal; and 16, an A/D converter which converts an analog signal output from the image sensing device 14 into a digital signal.

In addition, reference numeral 18 denotes a timing generating circuit which supplies clock signals and control signals to the image sensing device 14, the A/D converter 16, and a D/A converter 26 and is controlled by a memory control circuit 22 and a system control circuit 50.

Reference numeral 20 denotes an image processing unit which performs predetermined pixel interpolation processing and color conversion processing for data from the A/D converter 16 or data from the memory control circuit 22.

The image processing unit 20 performs predetermined arithmetic processing by using sensed image data. The system control circuit 50 controls an exposure control unit 40 and a focusing control unit 42 on the basis of the arithmetic processing result obtained by the image processing unit 20. That is, the system control circuit 50 controls AF (Auto-Focus) processing, AE (Automatic Exposure) processing, and EF (Electronic Flash pre-emission) processing according to the TTL (Through The Lens) system.

The image processing unit 20 performs predetermined arithmetic processing by using sensed image data, and also performs AWB (Auto White Balance) processing of the TTL system on the basis of the obtained arithmetic processing result.

The memory control circuit 22 controls the A/D converter 16, the timing generating circuit 18, the image processing circuit 20, an image display memory 24, the D/A converter 26, a memory 30, and a compression/decompression circuit 32.

Data from the A/D converter 16 is written in the image display memory 24 or the memory 30 through the image processing circuit 20 and the memory control circuit 22, or directly written in the image display memory 24 or the memory 30 through the memory control circuit 22.

In playback, compressed image data read out from a recording medium 200 or 210 to the memory 30 is decompressed by the image processing unit 20 and bitmapped in the image display memory 24.

Reference numeral 24 denotes the image display memory; 26, the D/A converter; 28, an image display unit comprising a TFTLCD and the like. Image data for display which is written in the image display memory 24 is displayed on the image display unit 28 through the D/A converter 26.

An electronic finder function can be implemented by sequentially displaying sensed image data using the image display unit 28.

The image display unit 28 can display and superimpose various kinds of information by OSD. The display contents are pieces of information concerning the single shot/continuous shooting mode, self timer, compression rate, number of recording pixels, number of recorded images, serial number of displayed image, number of recordable images, search key icon, shutter speed, f-number, exposure compensation, flash, red-eye effect relaxation, macro photography, buzzer setting, timepiece battery level, battery level, error, information by a plurality of digits, attached/detached state of a recording medium 200 or 210, operation of communication I/F, date/time, and the like.

The memory 30 is used to store sensed still images and moving images, and has a storage capacity large enough to store a predetermined number of still images and a moving image corresponding to a predetermined period of time. This makes it possible to write a large amount of image data in the memory 30 at a high speed in both the continuous shooting mode of continuously photographing a plurality of still images and the panorama photographing mode.

In addition, the memory 30 can also be used as a work area for the system control circuit 50.

The compression/decompression circuit 32 compresses/decompresses image data by adaptive discrete cosine transform (ADCT) or the like. The compression/decompression circuit 32 reads an image stored in the memory 30 and compresses or decompresses the image, and writes the processed data in the memory 30. Reference numeral 40 denotes an exposure control unit which controls the shutter 12 having the stop function and has a flash dimming function in cooperation with a flash 48; 42, a focusing control unit which controls focusing of the photographing lens 10; 44, a zoom control unit which controls zooming of the photographing lens 10; 46, a barrier control unit which controls the operation of the barrier 102 serving as a barrier; and 48, a flash which has a function of emitting AF auxiliary light and a flash dimming function.

The exposure control unit 40 and the focusing control unit 42 are controlled by the TTL system. The system control circuit 50 controls the exposure control unit 40 and the focusing control unit 42 on the basis of the result obtained by arithmetically processing sensed image data using the image processing unit 20.

Reference numeral 50 denotes the system control circuit which controls the overall digital camera 100 according to this embodiment; and 52, a memory which stores constants, variables, programs, and the like for the operation of the system control circuit 50.

Reference numeral 54 denotes a display unit which displays an operation state, a message, and the like when the system control circuit 50 executes a program. Part of the function of the display unit 54 is installed in an optical finder 104. Of the display contents displayed on the display unit 54, display contents displayed in the optical finder 104 are pieces of information concerning in-focus, camera shake warning, electronic flash charge, shutter speed, f-number, exposure correction, and the like.

Reference numeral 56 denotes a nonvolatile memory capable of electrically erasing and recording data. For example, an EEPROM is used as this memory.

Reference numerals 60, 62, 64, and 70 denote operation means for inputting various kinds of operation instructions for the system control circuit 50. These operation means comprise switches, a dial, a touch panel, a pointing device by line-of-sight detection, a speech recognition device, and the like or a combination of a plurality thereof. These operation means will be specifically described below.

Reference numeral 60 denotes a mode dial switch which can switch and set various function modes such as power supply ON/OFF operation, the photographing mode, the display mode, and the PC connection mode. The photographing mode includes a moving image mode and a still image mode. The still image mode further includes an automatic mode, macro mode (near view mode), portrait mode (person photographing mode), snap mode (group photographing mode), and scenery mode (distance view mode). When photographing is performed in either the moving image mode or the still image mode, sequential numbers are assigned to the file names recorded by this operation. Note, however, that the extension ".avi" indicating a moving image is added to the file name of each moving image, and the extension ".jpg" indicating a JPEG file is added to the file name of each still image.

Reference numeral 62 denotes the shutter switch SW1, which is turned on when a shutter button (not shown) is pressed to the first stroke, and instructs the start of operation such as AF (Auto-Focus) processing, AE (Automatic Exposure) processing, AWB (Auto White Balance) processing, or EF (Electronic Flash pre-emission) processing.

Reference numeral 64 denotes a shutter switch SW2, which is turned on when the shutter button is pressed to the second stroke (fully pressed), and instructs the start of a series of operations, i.e., exposure processing of reading out a signal from the image sensing device 14 and writing it as image data in the memory 30 through the A/D converter 16 and the memory control circuit 22, development processing using arithmetic processing by the image processing unit 20 and memory control circuit 22, and recording processing of reading out the image data from the memory 30, compressing the data by using the compression/decompression circuit 32, and writing the image data in the recording medium 200 or 210.

Reference numeral 70 denotes an operation unit comprising various buttons, a touch panel, and the like, which includes a menu button, a set button, a flash set button, a single shot/continuous shooting/self timer switching button, a button for selecting a menu item, buttons which indicate the upper, lower, left, and right directions and are used for image search (to be described later), and the like.

Reference numeral 80 denotes a power supply control unit which comprises a battery detection circuit, a DC-DC converter, a switch circuit for switching blocks to be energized, detects attachment/detachment of a battery, the type of battery, and the remaining amount of the battery, and controls the DC-DC converter on the basis of the detection result and an instruction from the system control circuit 50, thereby applying a necessary voltage to each unit including the recording medium for a necessary period of time.

Reference numeral 82 denotes a connector; 84, a connector; and 86, a power supply means comprising a primary battery such as an alkaline battery or lithium battery, a secondary battery such as an NiCd battery, NiMH battery, or Li battery, an AC adapter, and the like.

Reference numerals 90 and 94 denote interfaces with recording media such as a memory card and a hard disk; 92 and 96, connectors for connection to recording media such as a memory card and a hard disk; and 98, a recording medium attachment/detachment detection unit which detects whether the recording medium 200 or 210 is attached to the connector 92 or 96.

This embodiment has exemplified the arrangement having two systems of interfaces and connectors for the attachment of recording media. Obviously, however, a single or a plurality of systems of interfaces and connectors for the attachment of the recording media may be used. Alternatively, the embodiment may have an arrangement comprising a combination of interfaces and connectors based on different standards.

Interfaces and connectors conforming to a standard such as a PCMCIA card or CF (compact flash (registered trademark)) card can be used.

Assume that interfaces and connectors conforming to a standard such as a PCMCIA card or CF (compact flash (registered trademark)) card are adopted as the interfaces 90 and 94 and the connectors 92 and 96. In this case, connecting various kinds of communication cards such as a LAN card, a modem card, a USB card, an IEEE1394 card, a P1284 card, a SCSI card, or a communication card for PHS makes it possible to transfer image data and management information attached to the image data to another computer and a peripheral device such as a printer.

Reference numeral 102 denotes a barrier serving as a protecting means for preventing contamination and breakage of the lens 10 of the digital camera 100 by covering the image sensing unit; 104, an optical finder which allows photographing to be performed without using the electronic viewfinder function by the image display unit 28; and 110, a communication unit which has various communication functions, such as RS232C, USB, IEEE1394, P1284, SCSI, modem, LAN, or wireless communication.

Reference numeral 112 denotes a connector for connecting the digital camera 100 to another device through the communication unit 110 or an antenna in the case of wireless communication.

Reference numerals 200 and 210 denote recording media such as memory cards and hard disks. The recording media 200 and 210 comprise recording units 202 and 212 comprising a semiconductor memory, a magnetic disk, or the like, interface units 204 and 214 with the digital camera 100, and connectors 206 and 216 for connection to the digital camera 100.

<Explanation of Structure of Image Data>

As described above, the digital camera 100 according to this embodiment can photograph moving images and still images and store them in the recording media 200 and 210. When a file is to be stored, its file name is formed by a character string comprising a sequential number obtained by adding "1" to the number of the immediately preceding file name. The extension "avi" is added to the file name of a moving image file, and the extension ".jpg" is added to the file name of a still image file. Assume that the file names of files to be stored in the recording media 200 and 210 in this embodiment are "C#####.avi" and "C#####.jpg". Note that "#" of the portion "#####" represents a numeral between 0 and 9. The portion "#####" will be referred to as "the index number of a file name" hereinafter. In this embodiment, such numbers are automatically assigned to files in the order in which they are stored in the storage medium in the above manner. However, after files are recorded, the order of numbers may be changed on the basis of a predetermined editing operation by the user.

According to the above description, therefore, moving image data files and still image data files can be identified by checking their extensions. Assume that moving images are photographed in the auto focus and automatic exposure modes. In contrast, still images can be photographed upon selection of various modes, as described above.

Figure 2:
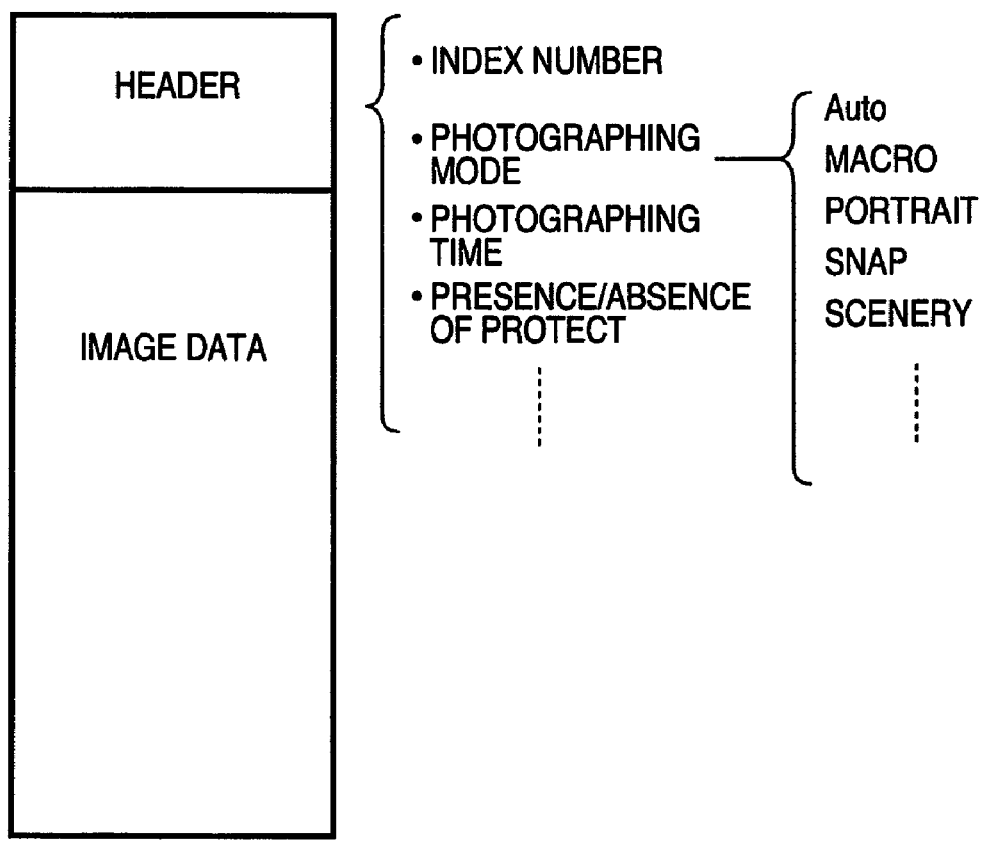
FIG. 2 is a view showing the data structure of an image file in this embodiment.

FIG. 2 shows the structure of a still image data file. As shown in FIG. 2, the header contains "index number of file name", "photographing mode", "photographing date (storage date)", and "protect".

"Photographing mode" includes "Auto", "macro", "portrait", "snap", and "scenery". In which mode photographing is performed is determined by setting of the mode dial 60. "Photographing date" is the information of year/month/day/hour/minute/second of photographing. "Protect" is a flag for preventing the corresponding image from being deleted by erroneous operation. If this flag is turned on, the image cannot be deleted unless the recording medium is initialized (cannot be deleted by normal image deleting operation). This flag can be turned on by performing a predetermined operation using the operation unit 70 after photographing and recording are finished.

Assume that the header of a moving image file contains photographing date information and the index number of the file name. Note, however, that since pieces of file creation date information can be managed by file systems created in the recording media 200 and 210, a search with a photographing date (to be described later) may be performed by using such information.

<Explanation of Overall Processing>

When this apparatus is powered on, initialization processing is performed, and an instruction input from the operator upon operating various kinds of switches and buttons is detected in step S1. If an instruction input is detected, the flow advances to step S2 to determine whether the instruction input is from the mode dial 60 and the display mode is set. If it is determined that the display mode is set, the flow advances to step S3 to execute image display processing. If it is determined that an instruction other than the above instruction is input, the flow advances to step S4 to perform corresponding processing. If, for example, the shutter button is pressed, photographing processing is executed. If the instruction is to switch modes, processing is performed to shift to the corresponding mode. This embodiment is characterized by display processing. Therefore, a description of processing in step S4 is omitted, and step S3 will be described.

<Outline of Display Processing (Step S3)>

As described above, as the recording medium 200 and the like increase in capacity, images (still images and moving images) stored in them increase in number.

If, therefore, photographed images are sequentially displayed in the order of photographing dates (or the index numbers of file names), the user needs to perform frame advancing operation many times to find a target image.

In this embodiment, therefore, image search is performed upon facilitating switching of search keys such as the types (still image and moving image) of photographed images and photographing modes and switching by frame advancement (frame rewinding) as well as file order information such as photographing dates and the index numbers of file names. Implementation examples of such image search will be described below. This embodiment will exemplify the case wherein photographing dates are used as file order information used for file search. Obviously, however, a case wherein the index numbers of files are used can be described in the same manner.

Figure 4:
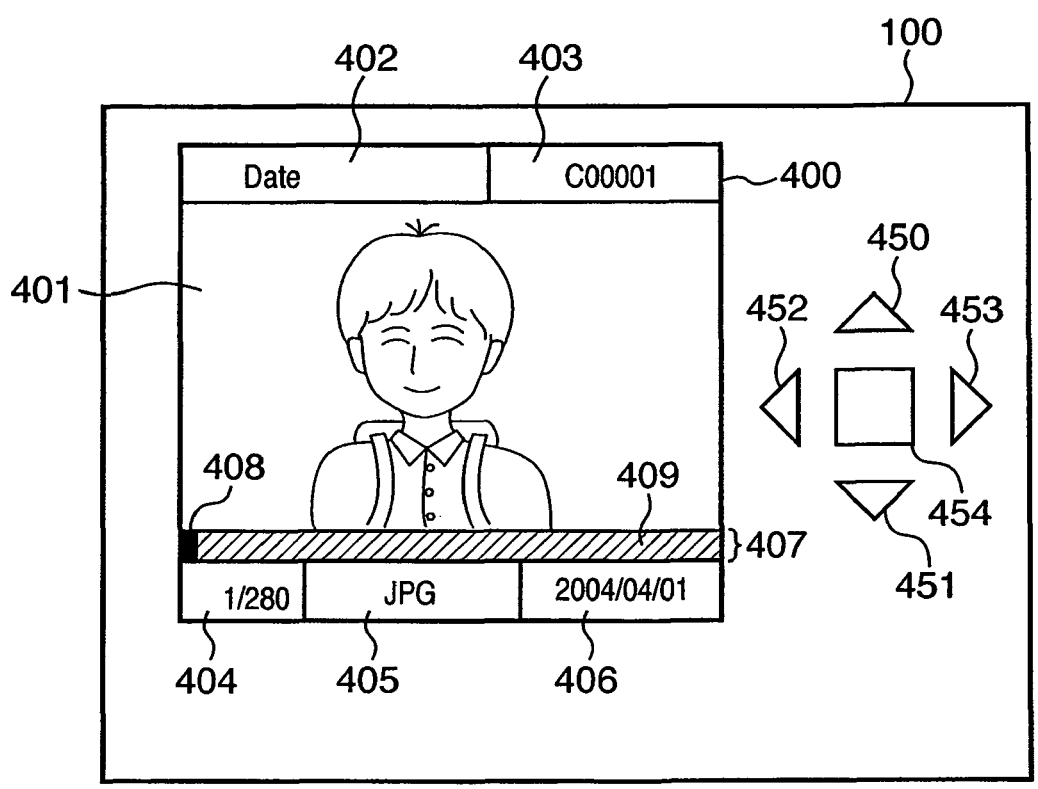
FIG. 4 is a view showing the state of the back face of the digital camera when a display mode is selected in this embodiment.

FIG. 4 shows an example of the back view of the digital camera according to this embodiment immediately after the display mode is designated.

Referring to FIG. 4, reference numeral 400 denotes a display window on the image display unit 28; 450 to 453, upper, lower, left, and right keys of the operation unit 70; and 454, an execution key.

The display window 400 includes an image display area 401 for displaying an image, a search key area 402 for displaying the type of search key, a file name display area 403 for displaying the file name of a displayed image (excluding the extension), an image order display area 404 for displaying what number the displayed image is in all the images in the recording medium 200 or 210 (FIG. 4 shows that the total number of images is 280, and the first (oldest) image is displayed), an image type area 405 for indicating the type of image, a photographing date area 406 for displaying the photographing date of the displayed image, and a position display area 407 as an indicator indicating the position of the displayed image on the time axis in all the recorded images and the distribution of files matching/unmatching a search condition. Reference numeral 408 in the position display area 407 denotes the position of the rank (photographing date) at which the displayed image is stored.

In the above window arrangement, the operator uses the keys 450 and 451 for search. The keys 450 and 451 (upper and lower keys) are used to switch the types of search keys. The key 452 is used to designate display of the previous image, and the key 453 is used to designate display of the next image.

In the initial state after the shift to the display mode, as shown in FIG. 4, "Date" is set as a search key. This search key can be switched by operating the keys 450 and 451. As shown in FIG. 7, eight types of search keys which can be switched are provided.

In order to specify the type of the current search key, the search keys are managed by their index numbers inside the apparatus. That is, the index number is incremented/decremented by operating the keys 450 and 451. If an instruction to designate a number above the index number "8" is issued, the index number returns to "1". In contrast, if an instruction to designate a number below the lower limit number "1", the index number is set to "8".

Since "Date" is displayed as a search key in the search key area 402 immediately after the shift to the display mode, the index number is set to "1" immediately after the shift. In other words, setting the index to "1" after the shift to the display mode determines "Date" as a character string displayed in the search key area 402, and informs the operator of the corresponding information.

As shown in FIG. 7, when the search key "Date" is selected, all images are search targets regardless of whether they are moving or still images. When the operator presses the keys 452 and 453 in the display state in FIG. 4, therefore, a search is made for images stored in the recording medium in the order of photographing dates regardless of whether they are moving or still images, and the resultant images (reduced images) are sequentially displayed in the image display area 401. At this time, the position of the marker 408 moves in the horizontal direction, and the numerator in the image order display area 404 changes.

When the key 452 is pressed in the display state in FIG. 4, the latest image is displayed, and the marker 408 moves to the right end. This applies to the opposite case.

Assume that when a moving image is to be displayed, the character string "AVI" indicating a moving image is displayed in the image type area 405, and the first frame of the moving image (to be precise, the image obtained by reducing the first frame) is displayed in the image display area 401. When the button 454 is pressed while the first frame is displayed, the moving image is played back.

A case wherein the keys 450 and 451 are operated will be described below. The key 450 functions as a key for incrementing the index number. The key 451 is a key for decrementing the index number. Obviously, according to FIG. 7, since the index number cannot go below "1" or beyond "8", when the key 451 is pressed while the index number is "1", the index number is set to "8".

Figure 5:
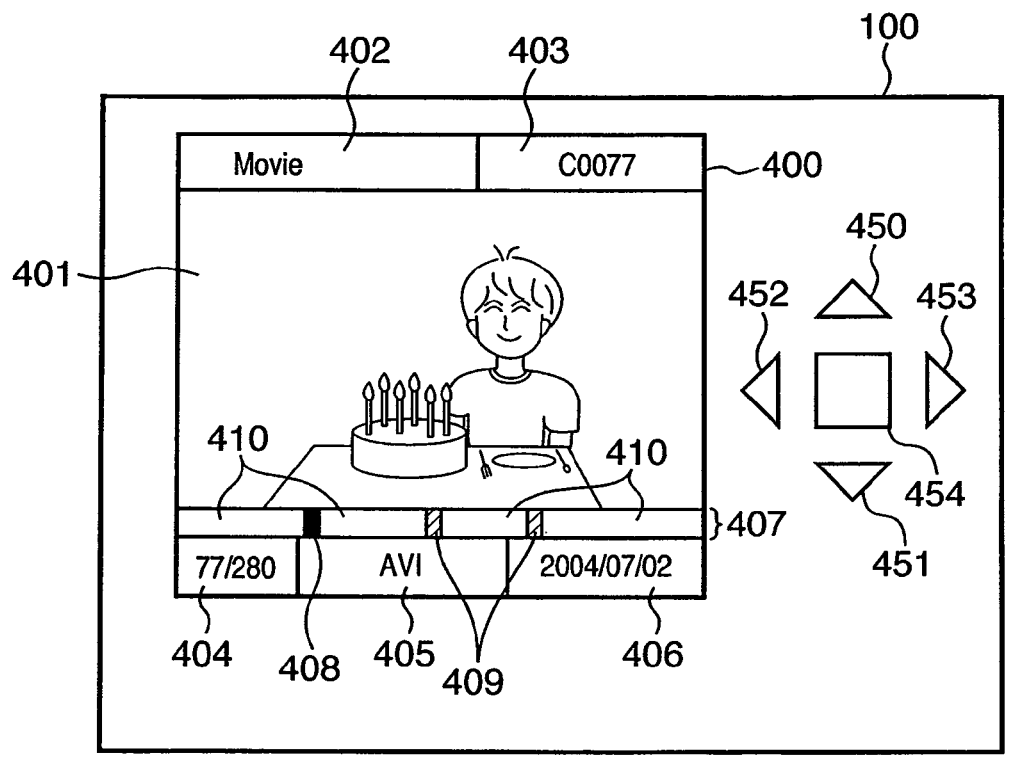
FIG. 5 is a view showing a display example when a search key is changed.

FIG. 5 shows a display example when the key 450 is operated in the state shown in FIG. 4, i.e., the index number is updated to "2".

When the index number is updated to "2", moving images are set as search targets according to the table in FIG. 7. At this time, first of all, the system control circuit 50 searches for moving image files (files with the extension ".avi") stored in the recording medium 200 or 210. Assume that the search result reveals that the 77th, 130th, and 192nd files in all the 280 image files are moving image files.

In this case, the character string "Movie" determined by the index number "2" is displayed in the search key area 402.

Since the first image of the 280 images has been displayed as a still image in FIG. 4, the first frame of the 77th moving image is displayed in the image display area 401 so as to display the nearest moving image after the still image. In addition, "C0077" is displayed as a file name in the file name display area 403, and the character string "AVI" by which the file name indicates a moving image is displayed in the image type area 405.

Attention should be given to the display form of the position display area 407. Since the image displayed in the image display area 401 is the 77th file, it should be easily understood from the relationship with the display example in FIG. 4 that the marker 408 in the position display area 407 is displayed at the position shown in FIG. 7. In the above case, since three files are found as moving images, the positions to which the marker 408 can move when the keys 452 and 453 are operated are limited to the three positions of markers 408 and 409. That is, when the key 454 is operated in the state shown in FIG. 5, the marker 408 moves to the 130th file at once. In contrast, since no moving image files as search targets exist in areas 410 in FIG. 5, the marker 408 does not move. With the search key "Date" in FIG. 4 described above, since all the images can be search targets, only two markers, i.e., the marker 408 and the marker 409 indicating that the marker can be moved are present in the position display area 407.

When the key 451 is operated to return the search key index to "1" in the state shown in FIG. 5, the state shown in FIG. 4 is restored. The image displayed in this case is the 77th moving image as in the case shown in FIG. 5. That is, when the type of search key is changed, an image to be displayed immediately after the change in the type of search key is determined on the basis of the ordinal number of the image displayed immediately before the change in type as a reference position. Note that if there is no file having a photographing date after the reference position when the type of search key is changed, a preceding file is found and displayed.

Figure 6:
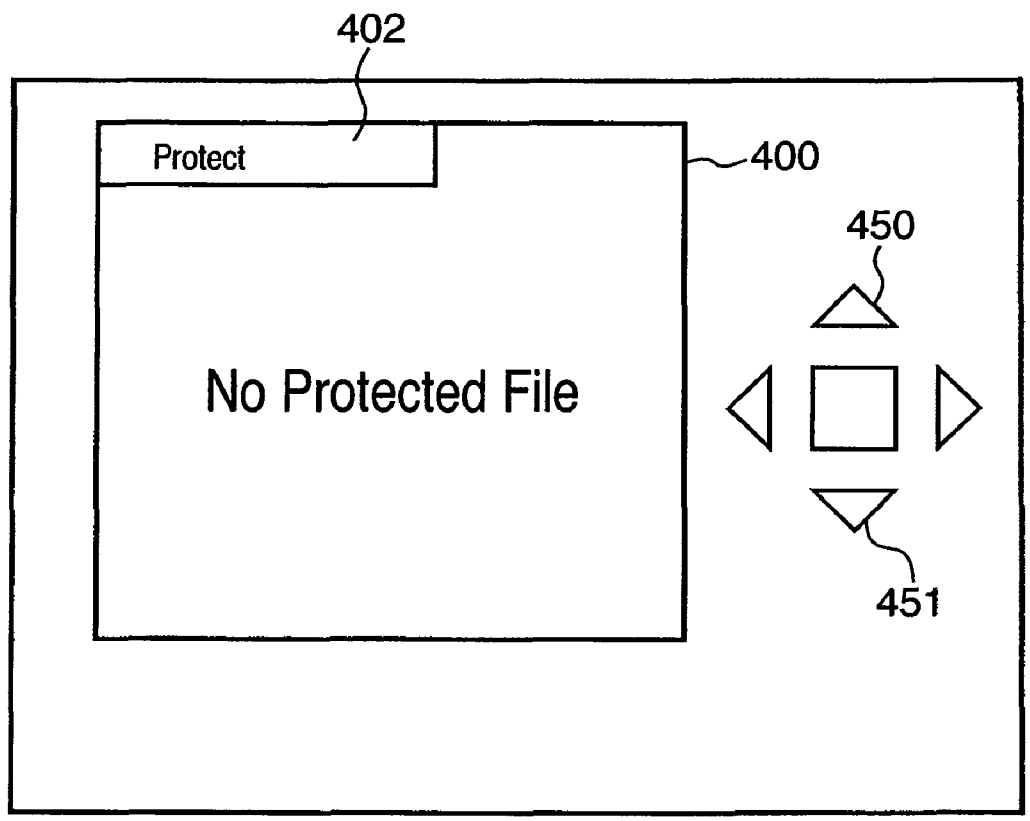
FIG. 6 is a view showing a display example in a case wherein when a search key is changed, no corresponding image exists.

When the type of search key is changed by operating the search keys 450 and 451, it can occur that there is no file matching the search key after the change. FIG. 6 shows such a state. FIG. 6 shows a display example in a case wherein when "Protect" is selected as a type of search key, i.e., an instruction to search for a protected file is given, there is no corresponding file in the recording medium 200 or 210.

As shown in FIG. 6, only a message indicating that there is no corresponding file and a character string indicating the search key used in this case are displayed in the image display area 401 of the display window 400, but no other information is displayed. In the case shown in FIG. 6, therefore, the operator operates the keys 450 and 451 to, for example, change the search key to another search key.

Figure 3:
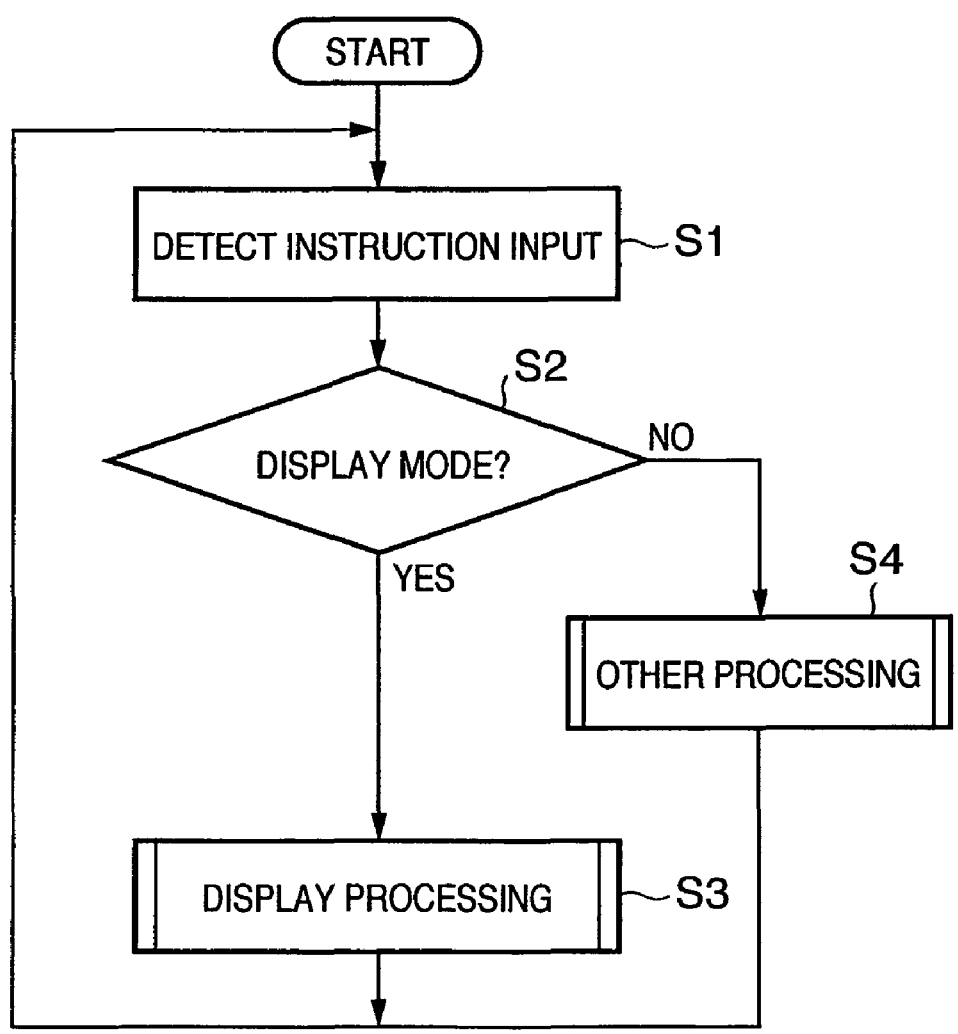
FIG. 3 is a flowchart showing main processing in the digital camera according to this embodiment.
Figure 8:
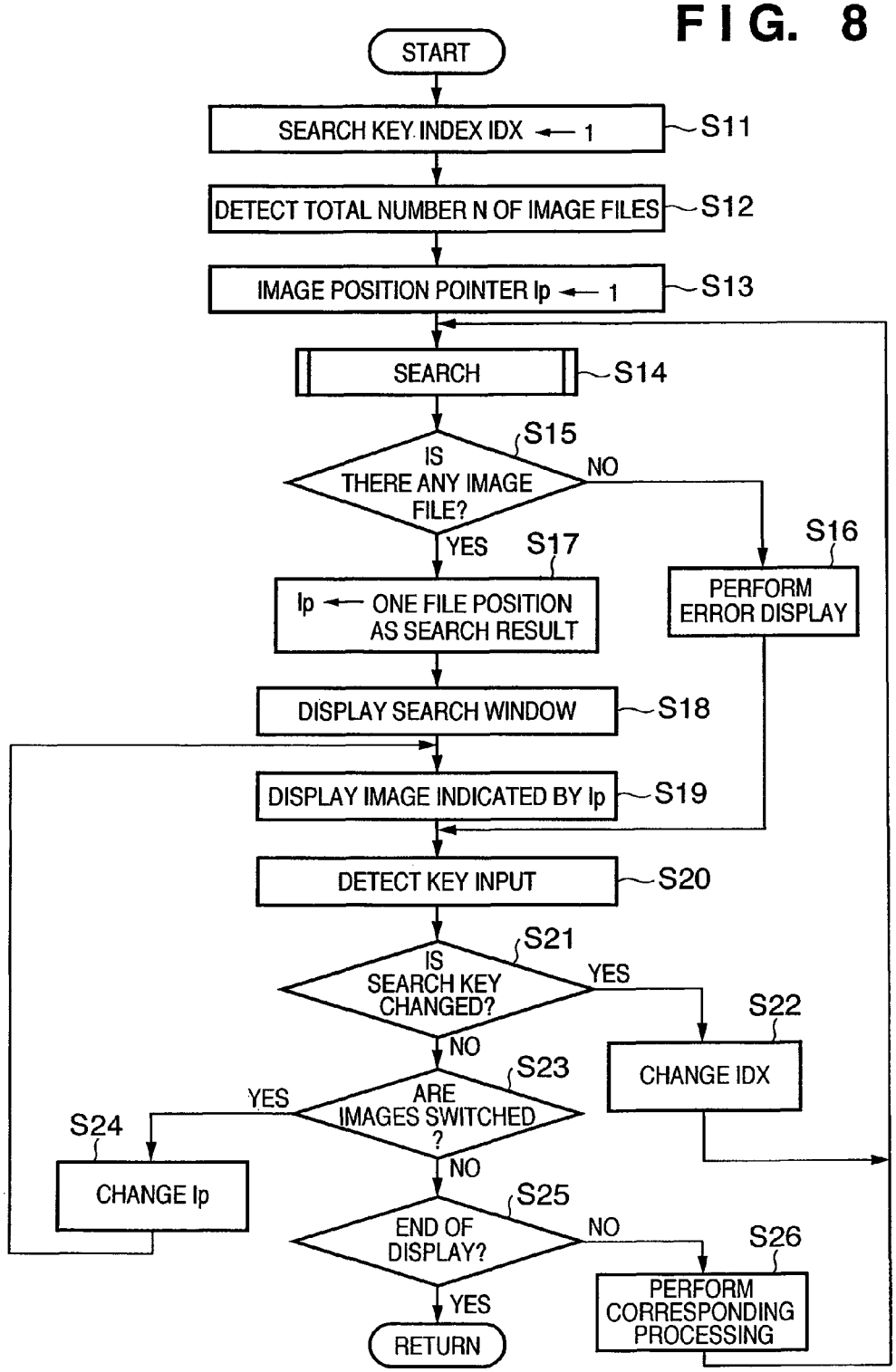
FIG. 8 is a flowchart showing a processing sequence in the display mode in this embodiment.

A specific processing sequence for implementing the above processing will be described with reference to the flowchart of FIG. 8. This processing also corresponds to the display processing (step S3) in FIG. 3. Note that several variables to be described below are ensured in the memory 52 used by the system control circuit 50.

When the operator switches to the display mode, "1" is set as an initial value to a variable IDX indicating a search key index number in step S11. That is, "Date" is set as the default search key. At this time, the upper and lower keys of the up, down, left, and right keys are assigned as keys for switching search conditions, and the left and right keys are assigned as keys for image switching (the left key is a key to photographing dates in the future direction, and the right key is a key to photographing dates in the past direction).

The flow then advances to step S12 to detect the total number (N) of image files stored in the recording medium 200 or 210.

In step S13, "1" is set to a pointer Ip indicating the position of an image file as a display target.

Subsequently, in step S14, the table shown in FIG. 7 is searched for an image as a search target on the basis of the search key index IDX set in step S12 (or step S22 to be described later).

Although the details of this search processing will be described later, variables P(1), P(2), ..., P(N) corresponding to the total number N of image files are ensured in the memory 52. In this case, "i" of P(i) indicates the ordinal number of the photographed image file in the order of photographing dates. If the jth file matches the search key, "1" is set to P(j). Otherwise, "0" is set to P(j).

In step S15, it is determined from the search processing result whether there is any corresponding file. If NO in step S15, the flow advances to step S16 to perform error display indicating that there is no corresponding file, as shown in FIG. 6.

If there is a file matching the search key, the flow advances to step S17 to set a value indicating the ordinal number of one file of images (a plurality of images can be present) obtained as a result of the search to the image pointer Ip. The following are the details of this operation:

If P(Ip)=1, no change is made in Ip.

If P(Ip)=0, P(k) having the value "1" after P(Ip+1) is found, and Ip is updated with k.

If no P(k) is found, P(m) having the value "1" is found retroactively from P(Ip), and Ip is updated with m.

The flow then advances to step S18 to draw a window in which the respective areas shown in FIG. 4 are ensured. The flow advances to step S19 to display the image (to be precise, the reduced image) indicated by the pointer Ip in the image display area 401. At this time, "Ip/N" is displayed in the image order display area 404, a character string (extension) indicating the type of image to be displayed is displayed in the image type area 405, and the photographing date of the image to be displayed is displayed in the photographing date area 406. In addition, the position display area 407 is generated and displayed.

For example, display processing for the position display area 407 is performed such that the entire area 407 is displayed in the predetermined first color, the position where P( )=1 is then displayed in the second color, and the position indicated by Ip is finally displayed in the third color. With this operation, the markers 408, 409, and 410 shown in FIGS. 4 and 5 are displayed (which will be described in detail later).

When the display processing in step S16 or steps S17 to S19 is complete, the flow advances to step S20 to wait for key input from the operator.

When some key input is detected, the flow advances to step S21 to determine whether the input instruction is a search key change instruction, i.e., the key 450 or 451 is pressed. If it is determined that the key 450 or 451 is pressed, the flow advances to step S22 to update the search key index IDX. As a result, since the search key is changed, the flow returns to step S14.

If it is determined that the designated key does not correspond to an instruction to change the search key, the flow advances to step S23 to determine whether the key corresponds to an instruction to switch the image, i.e., the key 452 or 453 is pressed.

If it is determined that the key 452 or 453 is pressed, the flow advances to step S24 to update Ip (which will be described in detail later). The flow then returns to step S19.

If it is determined that the instruction is not for image switching either, the flow advances to step S25 to determine whether the display mode is finished. If NO in step S25, the flow advances to step S26 to perform the corresponding processing. An example of this processing includes playback of a moving image, enlargement/scrolling of a still image, deletion of a file, or output processing to an external apparatus (e.g., a printer). When a file is deleted, the total number N of images is decreased by "1".

If it is determined in step S25 that an instruction to finish the display mode (an instruction to shift to another mode) is issued, this processing is terminated.

Figure 9:
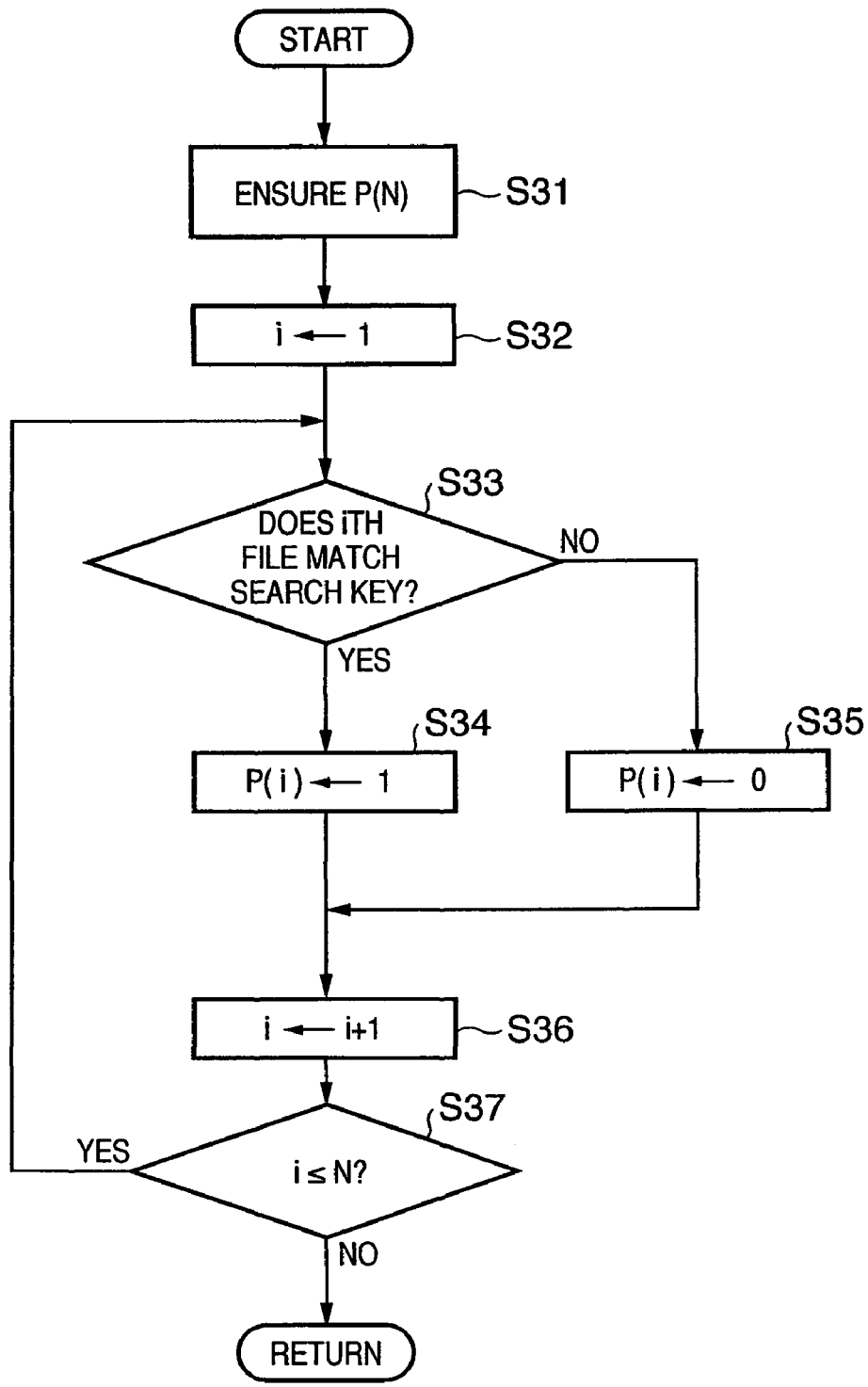
FIG. 9 is a flowchart showing a processing sequence in search processing in this embodiment.

The details of the above search processing (step S14) will be described next with reference to the flowchart of FIG. 9.

First of all, in step S31, N array variables P( ) are ensured in the memory 52. The flow then advances to step S32 to initialize a variable i for specifying an image into "1".

In step S33, the header, extension, and the like of the ith image are analyzed to determine whether the image matches the condition (see FIG. 7) specified by the search key set at this point of time. If the ith image matches the condition, "1" is set to the variable P(i) to indicate that the ith image is a display target candidate (step S34). If the ith image does not match the condition, since the ith image is not a display candidate as the search result, "0" is set to the variable P(i) (step S35).

The flow then advances to step S36 to increase the variable i by "1", and the processing in step S33 and the subsequent steps is repeated until it is determined in step S37 that discrimination processing is complete for all the images.

Figure 10:
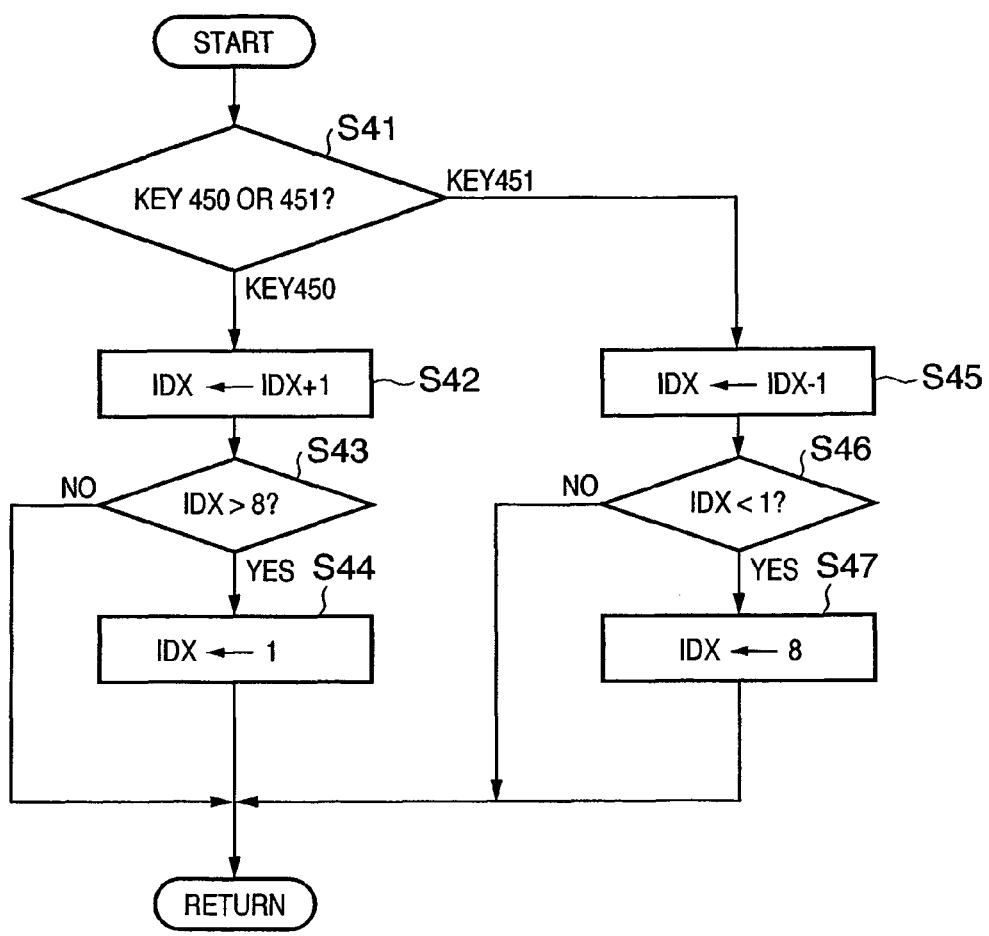
FIG. 10 is a flowchart showing a processing sequence when a search key change instruction is issued in this embodiment.

Processing (step S22) to be performed when a search key change instruction is issued will be described in detail next with reference to the flowchart of FIG. 10.

First of all, it is determined in step S41 whether the operated key is either the key 450 or the key 451. If it is determined that the key 450 is operated, the flow advances to step S42 to increase the search key index variable IDX by "1". As described, however, in this embodiment, there are eight types of search keys, as shown in FIG. 7. Therefore, IDX is inhibited from exceeding "8". For this reason, in step S43, IDX is compared with "8". If IDX>8, "1" is set to IDX in step S44.

If it is determined that the key 451 is pressed, IDX is decreased by "1" in step S45 to S47. If IDX becomes smaller than "1", IDX is set to "8".

Figure 11:
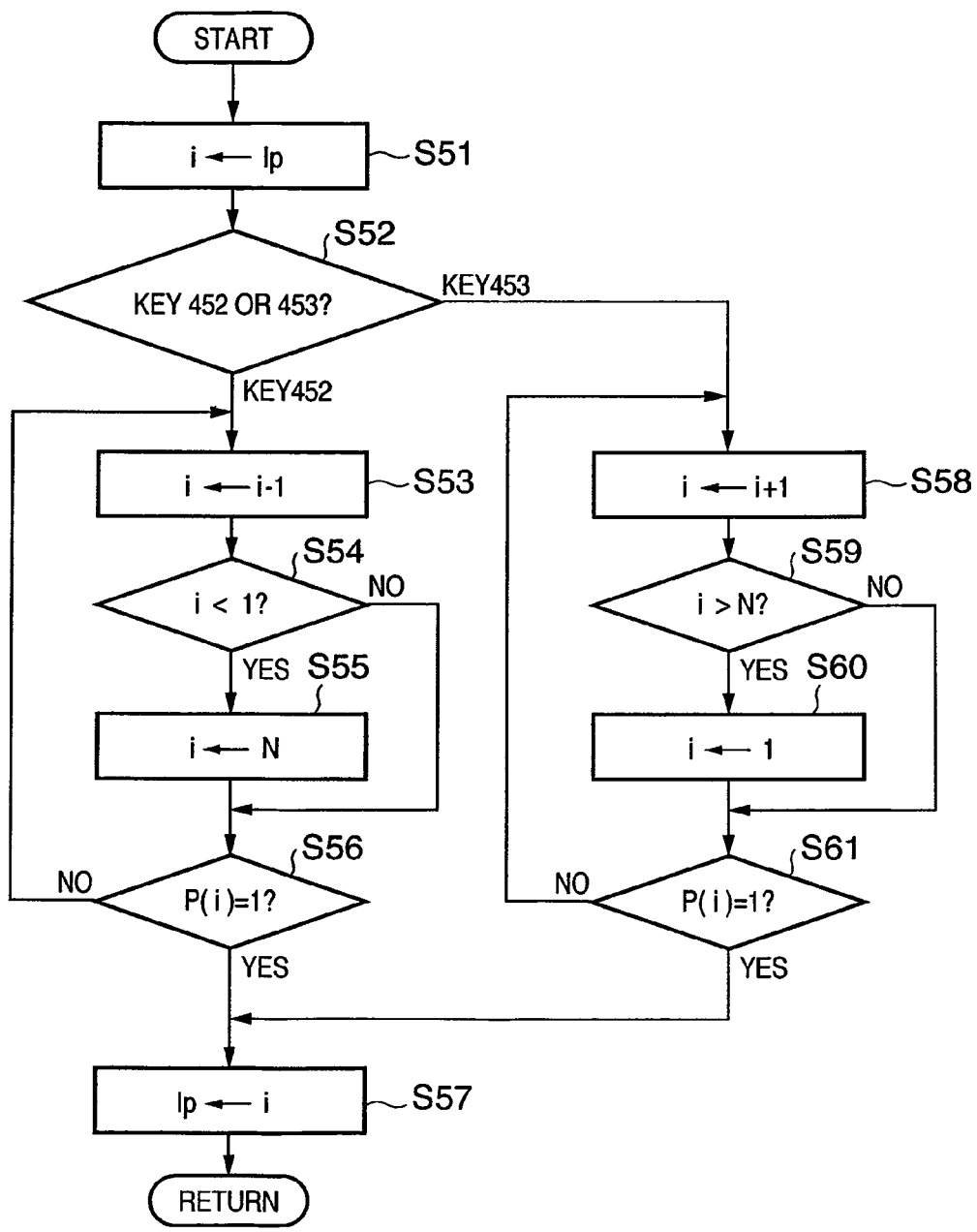
FIG. 11 is a flowchart showing a processing sequence when an image switch instruction is issued in this embodiment.

Processing (step S24) to be performed when an image switch instruction is issued will be described in detail next with reference to the flowchart of FIG. 11.

First of all, the pointer Ip indicating an image position at the current time point is stored in the variable i. It is determined in step S52 whether the operated key is either the key 452 or 453. If it is determined that the operated key is the key 452, the flow advances to step S53 to decrease the value of the variable i by "1". The variable i is inhibited from becoming smaller than "1" as a result of decreasing the variable. In steps S54 and S55, therefore, if the variable i is smaller than "1", N indicating the ordinal number of the final image is set to the variable i.

It is determined in step S56 whether P(i)="1", i.e., the ith image is set as a display target as a result of search. If NO in step S56, the processing in step S53 and the subsequent steps is repeated to search for an image which can be displayed. If P(i)="1" is found in this manner, the pointer Ip is updated with the variable i. As a result, the image in the area indicated by the pointer Ip is displayed in the image display area 401. In order to inform this position, therefore, the area indicated by the pointer Ip in the position display area 407 is displayed in the third color. This processing is then terminated.

If it is determined in step S52 that the key 453 is pressed, images photographed after the current pointer Ip are searched for an image set as a display target in search processing (step S14) in steps S58 to S61. The search direction in the processing in steps S58 to S61 is opposite to that in the processing in steps S53 to S56, and hence a description thereof will be omitted.

Figure 12:
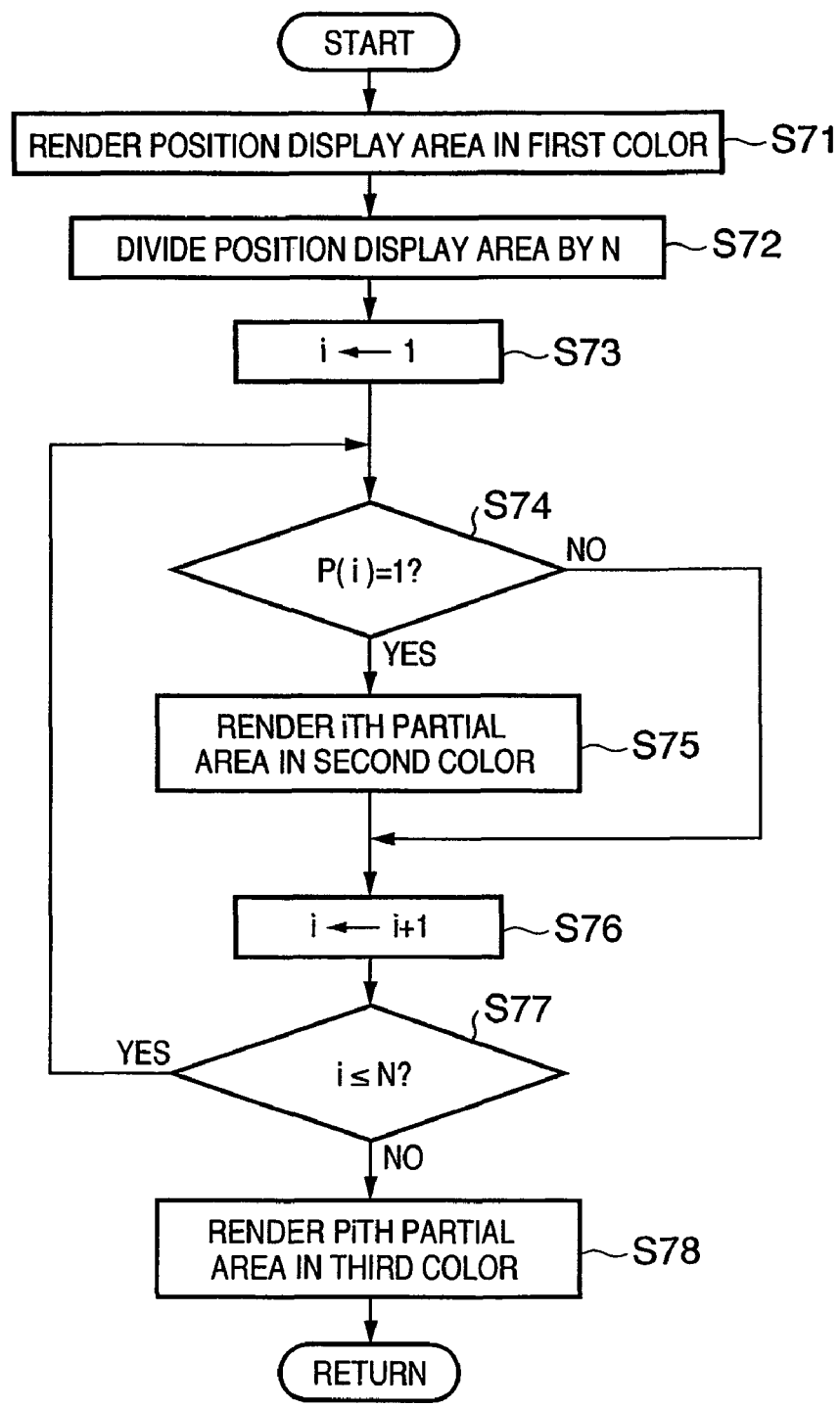
FIG. 12 is a flowchart showing a processing sequence for display in a position display area in this embodiment.

Display processing for the position display area 407 indicating the relative position of an image matching a search condition in this embodiment will be described next in accordance with the flowchart of FIG. 12. This processing is part of the processing in step S18 in FIG. 8. Note that the total number N of image files and the variable P( ) indicating matching/unmatching with a search condition have already been discriminated before the start of this processing.

First of all, in step S71, the entire position display area 407 is drawn in the first color. In step S72, the position display area 407 is divided by the total number N of image files in the horizontal direction. In this case, each of the divided areas is expressed as a partial area.

The flow then advances to step S73 to set "1" as the initial value of the variable i. In step S74, it is determined whether the variable P(i) is "1", i.e., the ith image file of the image files arranged in the order of photographing dates matches the search condition indicated by the search key index IDX. If it is determined that the file matches the search condition, the flow advances to step S75 to draw the ith partial area in the second color so as to inform that the image can be a display target.

The flow then advances to step S76 to increase the variable i by "1". In step S77, the variable i is compared with the total number N of image files. The processing in step S74 and the subsequent steps is repeated as long as i≦N.

As a result of the above processing, the locations of images, of the N image files, which match the search condition are displayed in the second color.

The flow then advances to step S78 to draw the ipth partial area in the third color in accordance with the pointer Ip indicating the ordinal position of the image displayed in the image display area 401. This processing is then terminated.

As described above, according to this embodiment, when found images are to be displayed, the position display area 407 is displayed to allow the operator to check the locations or distribution of images, of all the images arranged in the order of photographing dates, which match the search condition. In addition, the search condition can be seamlessly changed during image search and display, thereby allowing the operator to find a target image with simple operation.

Furthermore, displaying the marker 408 in the position display area 407 allows the operator to know how old the photographing date of the image displayed as a result of a search is relative to the all images stored in the recording medium. In addition, displaying images matching and unmatching a search condition as the markers 409 and 410 allows the operator to know the approximate distribution and ratio of images matching and unmatching the search condition.

In the above embodiment, it is assumed that immediately after the operator switches to the display mode, "Date" is set as a search key, and the oldest image is displayed in the image display area 401. However, the latest image may be displayed in consideration of the fact that immediately after photographing is performed, the photographed image is displayed to be checked. In this case, in step S13 in FIG. 8, N indicating the final image may be set to Ip.

In addition, an image to be displayed after a search key is changed is an image whose photographing date is close to that of the image displayed immediately before the search key is changed. It however suffices to display the oldest (or latest) image of images found after the search key is changed.

Second Embodiment

The second embodiment will be described next. A characteristic feature of the second embodiment is a display mode, which is designed to meet requirements such as a requirement to see an image dated one month, one day.

For this purpose, in the second embodiment, a search is made for images by using days and months as delimiter positions. In the second embodiment, therefore, as shown in FIG. 13, "Day" and "Month" are added as the index numbers "9" and "10" of search keywords to the table shown in FIG. 7. The keywords "Day" and "Month" are directed to all images as search targets. Obviously, when the second embodiment is applied, since the total number of search keywords is 10, "IDX>8" in step S43 in FIG. 10 is changed to "IDX>10?".

Figure 14:
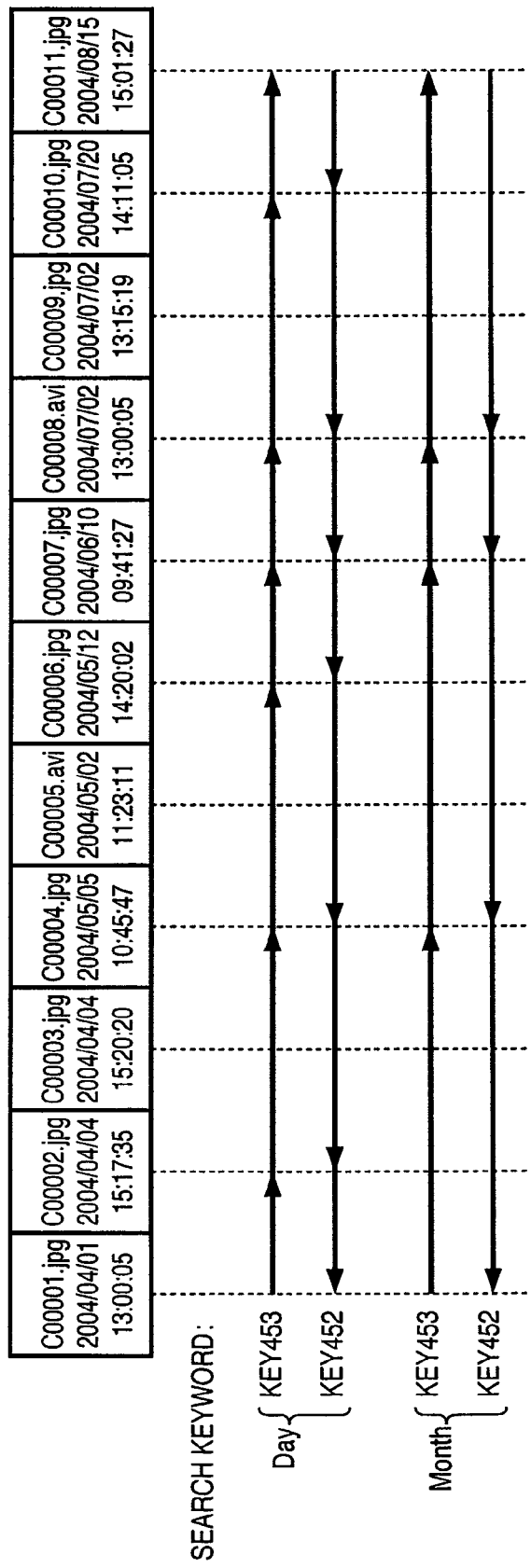
FIG. 14 is a view showing the moving direction and amount of an image display pointer in the case of a search key in the second embodiment.

FIG. 14 shows image files (indicated by file names, photographing dates, and hours/minutes/seconds in FIG. 14), which are arranged in the positive direction on the time axis directed from the left to the right. The arrows indicate the moving directions and amounts of pointers Ip indicating displayed images when keys 452 and 453 are operated.

It therefore suffices to detect the position of a change of day or month of a photographing date and move the pointer Ip to the detected position.

Figure 15:
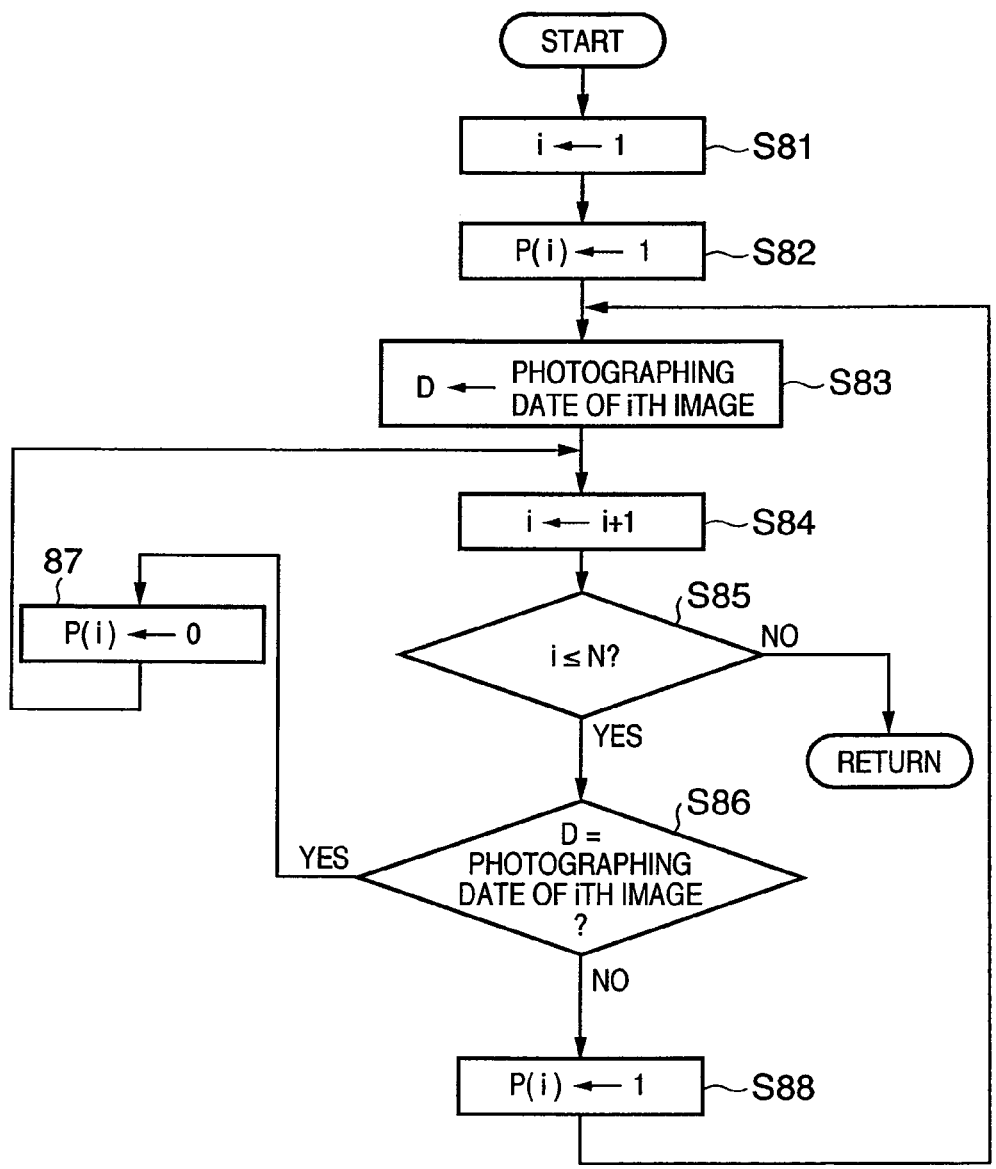
FIG. 15 is a flowchart showing a search processing sequence in the second embodiment.

FIG. 15 is a flowchart showing search processing (step S14 in FIG. 8) when "Day" is selected as a search key. Note that since processing to be performed when "Month" is selected can be realized by replacing "day" with "month", a description thereof will be omitted.

First of all, in step S81, "1" is set as an initial value to a variable i. The flow then advances to step S82 to store "1" in a variable P(i) so as to set the oldest image as a display target.

In step S83, the photographing date of the ith image is acquired from the header and is stored in a variable D. In step S84, the variable i is increased by "1". Since the variable i is inhibited from exceeding the total number (N) of images, the corresponding determination is performed in step S85. The following description is based on the assumption that i≦N.

In step S86, the photographing date is acquired from the header of the ith image file and compared with the variable D. If it is determined that they coincide with each other, i.e., the image matches the photographing date, "0" is stored in the variable P(i) in step S87. The flow then returns to step S84.

If an image file whose photographing date differs from the variable D is found, the flow advances to step S88 to store "1" in the variable P(i) so as to set a candidate to which the pointer Ip can be moved. The flow returns to step S83 to update the variable D.

The above processing is executed until it is determined in step S85 that search processing with respect to all the images is complete.

If "Day" is designated as a search key in FIG. 15 as a result of the above processing, a variable P( )="1" of only the position of the image indicated by the leading edge or trailing edge of an arrow is set. In processing (step S24 in FIG. 8) to be performed when an image switch instruction is issued, only images with switched photographing dates are displayed.

Note that the above description has exemplified the processing performed with "Day" being set as a search keyword. Obviously, however, processing with "Month" being set as a search keyword can be realized by replacing "day" with "month" in FIG. 15.

The above description is about the second embodiment. However, if, for example, many image files exist in a recording medium 200 or 210, the following usage pattern is conceivable. First of all, a rough search is performed on a monthly or daily basis. If it is confirmed from the images displayed at this time that a target image has been photographed on near a certain day or month, the search key is switched to "Date" or the like.

Although "Day" and "Month" in the second embodiment are targeted to all images, they may be made to correspond to only still images or only moving images, or may be selectively targeted to either of the two types of images. In order to cope with a further increase in the capacity of a recording medium, a search may be performed on a yearly basis or weekly basis.

Although the first and second embodiments of the present invention have been described above, the above embodiments are merely examples. That is, the types and number of search keywords are not limited to those in the above embodiments, and may be changed as needed.

The embodiments have exemplified the case wherein the pair of keys 450 and 451 in the upper and lower directions are used to switch search keys. However, for example, different pairs of keys may be used for the selection of the still image or moving image file format, the selection of photographing modes, and selection associated with time (Date, Day, Month, and the like). That is, independent pairs of keys are used for the respective search categories. As a consequence, the number of keys slightly increases, but the operator can, for example, set the still image mode with macro photography mode and switch images on a monthly basis.

As described above, according to the first and second embodiments, when images, of image files managed on the basis of photographing dates, which match a search condition are to be displayed, the images matching the search condition can be sequentially displayed such that the operator can check the positions or distribution of the image files, in all the image files, which match the search condition.

In addition, assigning the function of issuing an instruction to change a search condition to the upper and lower keys of the upper, lower, left, and right keys and the image display switching function for displaying images matching the search condition to the left and right keys makes it possible to seamlessly issue instructions to perform a search and display images.

Third and Fourth Embodiments

The third and fourth embodiments will be described next. Since the apparatus arrangement in these embodiments is the same as that shown in FIG. 1, a detailed description thereof will be omitted.

Third Embodiment

Search processing in the third embodiment will be described next with reference to FIGS. 16 to 18.

[File Arrangement]

Figure 16:
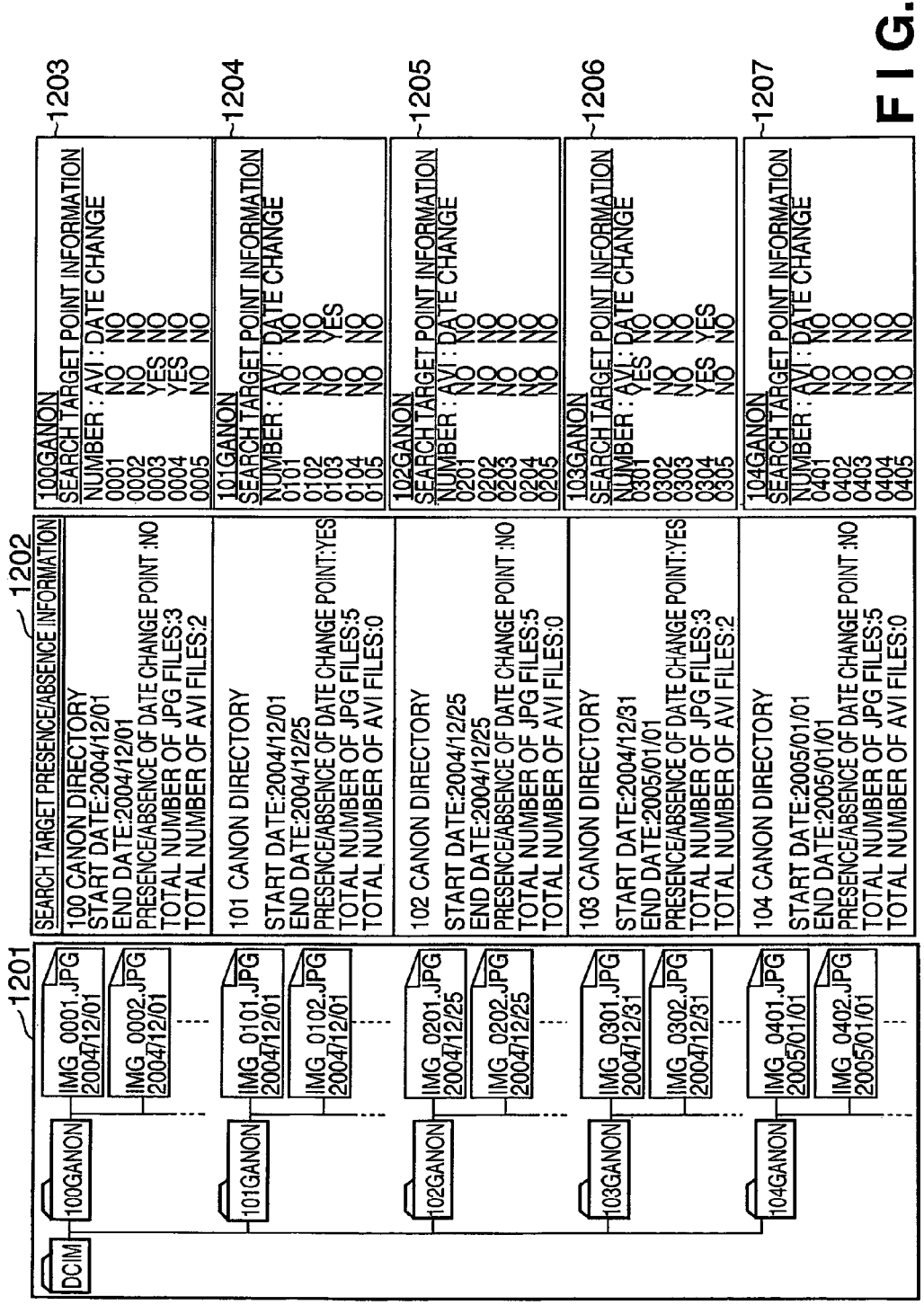
FIG. 16 is a view showing an example of a directory structure and an example of management information in the third and fourth embodiments.

FIG. 16 shows an example of the arrangement of files and an example of management information stored in a recording medium 200 or 210.

Reference numeral 1201 denotes directories and an example of the arrangement of files stored in the directories. In this case, the file arrangement conforms to the DCF (Design Rule for Camera File System) standard which is generally used for digital cameras.

Reference numeral 1202 denotes an example of search target presence/absence information. That is, search target presence/absence information associated with the files in each directory is held as a search condition. In this case, as search target presence/absence information in each directory, a management information file is held, which contains, for example, the start date (the oldest photographing date, i.e., the search start point), the last date (the latest photographing date, i.e., the search end point), the presence/absence of a date change point (files with different photographing dates), and the total numbers of files having specific formats (e.g., the extensions "JPEG" and "AVI") or attributes in each directory. That is, search target presence/absence information is management information which holds the start point (search start point) and the end point (search end point) of the files (or the directory) in each directory as search targets and is used to manage search target points (the presence/absence of a date change point, the total numbers of files with specific formats, and the like) between the search start point and the search end point.

Note that search target presence/absence information may include a photographing condition (indicating the single shot mode, continuous shooting mode, or panorama mode) and color information (monochrome, color, or the like) of an image file. At least one of these pieces of information may be set as a target.

Reference numerals 1203 to 1207 denote examples of search target point information in the respective directories. In this case, such information is held while a flag indicating a date change point for each file in each directory (in the case shown in FIG. 16, a flag is set in a file with a different date) and a flag indicating whether a specific format (extension) is used (in the case shown in FIG. 16, a flag is set in a file in the AVI format) are associated with each file number (file name).

Note that the above files of search target presence/absence information and search target point information are simultaneously created by using conditions at the time of photographing, setting information, and the like stored in each image header at the time of photographing when directories and/or a file arrangement in a recording medium are/is analyzed. The files of search target presence/absence information and search target point information are then writably and/or readably recorded on a recording medium such as a nonvolatile memory.

Figure 17:
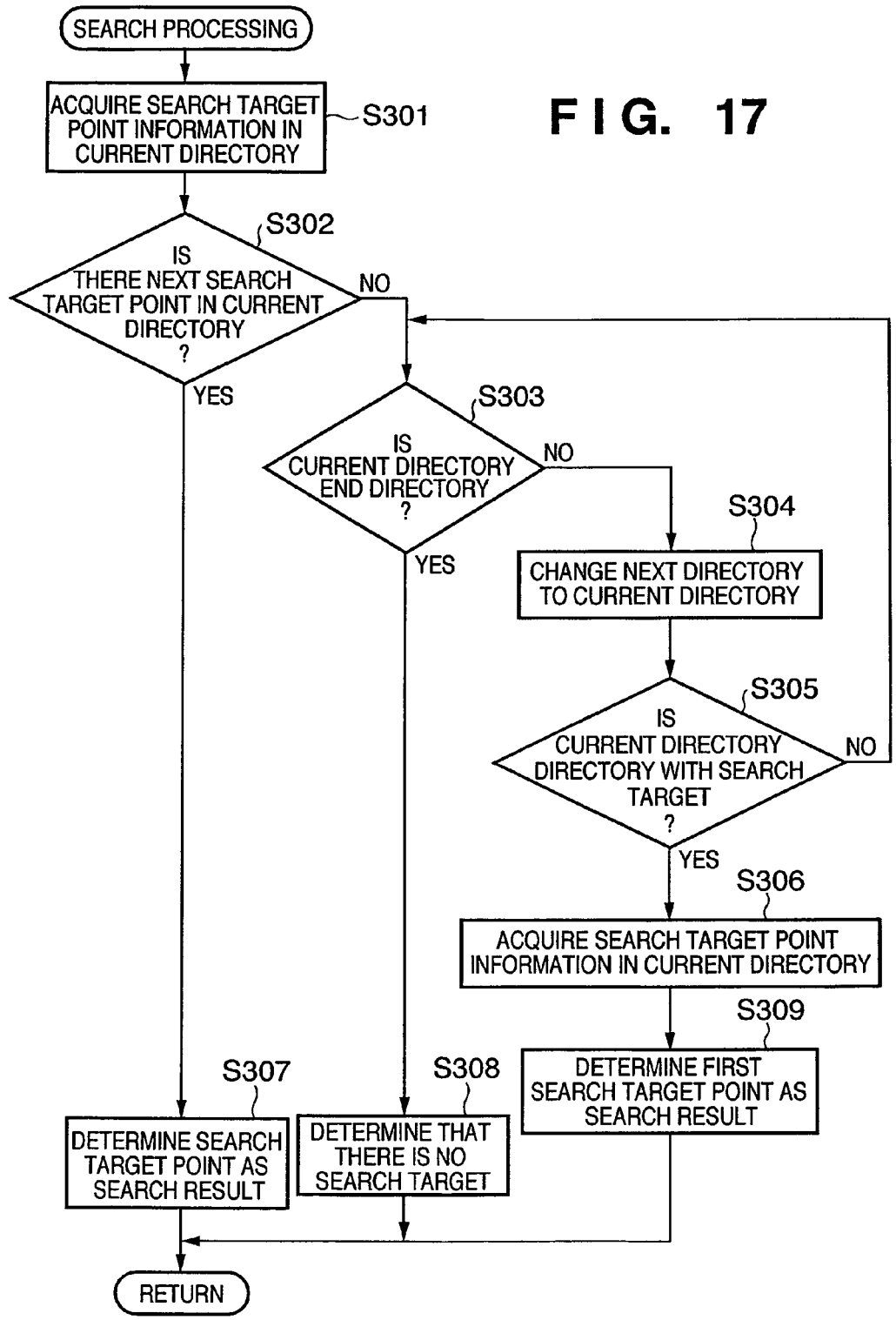
FIG. 17 is a flowchart showing search processing in the third embodiment.

FIG. 17 is a flowchart showing the processing of searching for a search target point in the third embodiment. The following processing is executed by a system control circuit 50.

A search target in the third embodiment is a directory or file corresponding to a search condition contained in search target presence/absence information.

Referring to FIG. 17, first of all, if a search processing instruction is issued through an operation unit 70, the search target point information of a directory (as a search target) containing a search start point is acquired (step S301).

It is checked from the search target point information acquired in step S301 whether there is a next search target point (step S302). If there is a next search target point, a file corresponding to this search target point is output as a search result to a display unit 54 (step S307), and the flow goes out of the loop.

If it is determined in step S302 that there is no search target point, the next direction is searched.

If it is determined in step S303 that the current directory is the end directory, information indicating that there is no search result is output to the display unit 54 (step S308). The flow then goes out of the loop.

If it is determined in step S303 that the current directory is not the end directory, the next directory is set as the current search target directory (step S304).

It is determined by referring to the search target presence/absence information whether there is any search target in the current directory set in step S304 (step S305). If it is determined that the directory includes a search target, the search target point information of the current directory is acquired for the first time at this point of time (step S306), and a file corresponding to the first search target point is output as a search result to the display unit 54 on the basis of the information of the first search target point of the search target point information (step S309). The flow then goes out of the loop.

If it is determined in step S305 that there is no search target point, the flow returns to step S303 to execute the same search processing as that described above for the subsequent directories.

Fourth Embodiment

Figure 18:
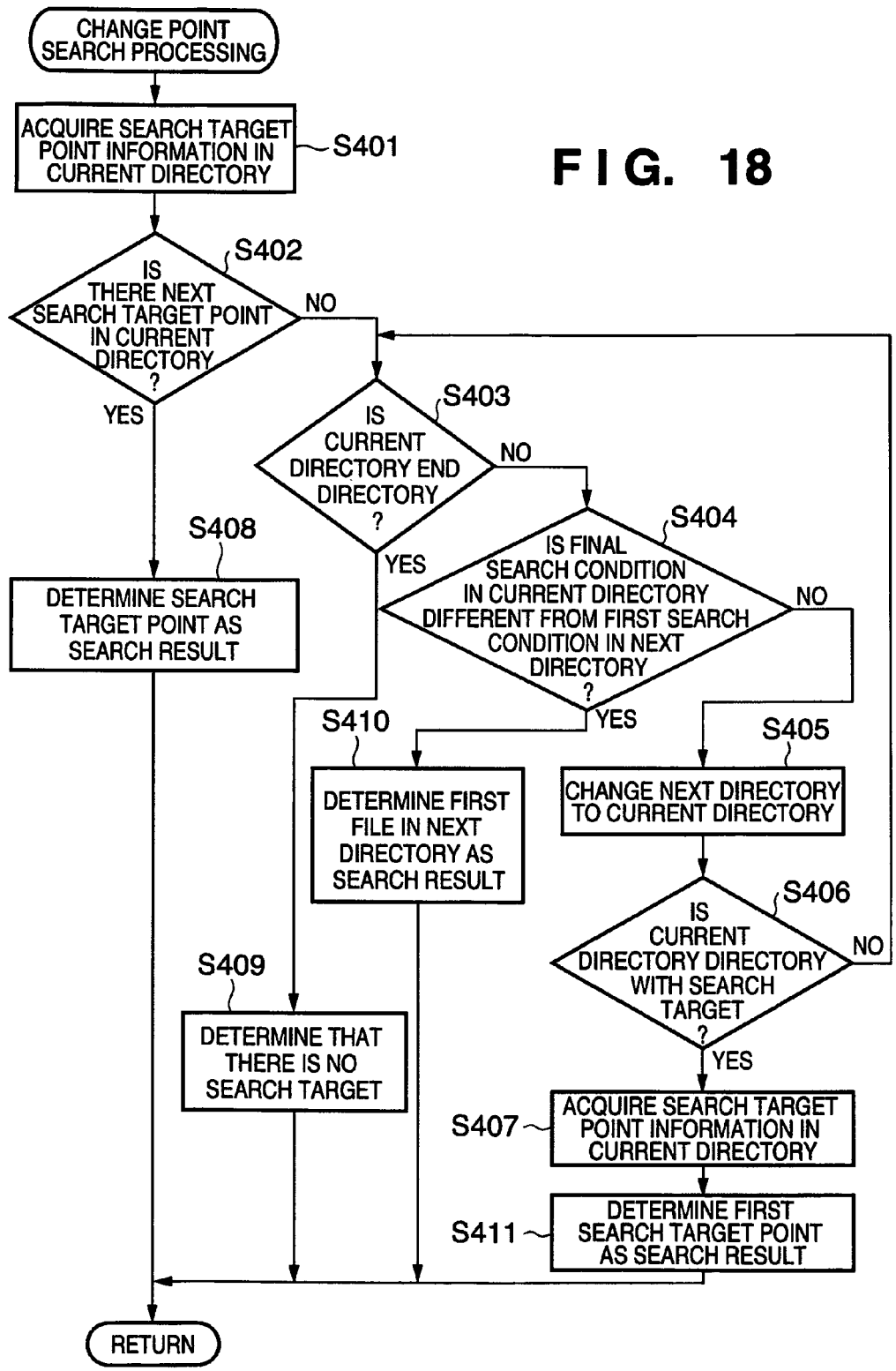
FIG. 18 is a flowchart showing search processing in the fourth embodiment.

FIG. 18 is a flowchart showing the processing of searching for a change point of a search target point in the fourth embodiment. The following processing is executed by a system control circuit 50.

A search target in the fourth embodiment is a directory or file corresponding to a change of a search condition (e.g., the presence of a date change point) contained in the search target presence/absence information.

First of all, if a search processing instruction is issued through an operation unit 70, the search target point information of a directory containing a search start point is acquired (step S401).

It is checked from the search target point information acquired in step S401 whether there is a next search target point (step S402). If there is a next search target point, a file corresponding to this search target point is output as a search result to a display unit 54 (step S408), and the flow goes out of the loop.

If it is determined in step S402 that there is no next search point, the next directory is searched.

If it is determined in step S403 that the current directory is the end directory, information indicating that there is no search result is output to the display unit 54 (step S409). The flow then goes out of the loop.

If it is determined in step S403 that the current directory is not the end directory, the final search condition (search end point) of the current directory and the start search condition (search start point) of the next directory, which are simultaneously held in the search target presence/absence information, are compared with each other to determine whether the start file (or directory) in the next directory is a search target point (step S404). If the final search condition of the current directory differs from the start search condition of the next directory, it is determined that the boundary between these directories is a search target point. Otherwise, it is determined that the boundary of the directories is not a search target point.

If it is determined in step S404 that the boundary between the directories is a search target point, the first file in the next directory is output as a search result to the display unit 54 (step S410). The flow then goes out of the loop. If it is determined that the boundary between the directories is not a search target point, the next directory is set as the current directory (step S405).

It is determined by referring to the search target presence/absence information whether there is any search target in the current directory set in step S405 (step S406). If it is determined that the directory includes a search target, the search target point information of the current directory is acquired for the first time at this point of time (step S407), and a file corresponding to the first search target point is output as a search result to the display unit 54 on the basis of the information of the first search target point of the search target point information (step S411). The flow then goes out of the loop.

If it is determined in step S406 that there is no search target point, the flow returns to step S403 to execute the same search processing as that described above for the subsequent directories.

As described above, according to the third and fourth embodiments, since no search is made in a directory in which no search target is present, which is determined on the basis of search target presence/absence information, a high-speed search can be performed. In addition, since search target point information is held concerning only a directory in which a search target is present, the consumption of resources such as the RAM of the system can be suppressed.

In addition, since search target presence/absence information and/or search target point information are/is simultaneously created when directories and/or a file arrangement in a recording medium are/is analyzed and extracted, file system information acquired when the directories and/or the file arrangement in the recording medium are/is analyzed can be effectively used, and the number of times of access to the file system can be reduced. This makes it possible to shorten the processing time required to construct search target presence/absence information and/or search target point information.

In addition, writably and/or readably storing search target presence/absence information and search target point information as files in a recording medium such as a nonvolatile memory makes it possible to shorten the time required to reconstruct search target presence/absence information and/or search target point information.

Since a search condition or search conditions contained in search target presence/absence information is or are one or a plurality of a photographing condition, date, time, file format, file attribute, and color information, high-speed search which is convenience for the user, e.g., a search for a date change point or a search for only files in a specific format, can be realized.

In addition, search target presence/absence information includes a search target for which a search is made first in a directory and a search target for which a search is made last. The presence of a search target is determined by acquiring and comparing, at the correct time, a search target for which a search is to be made first in a search area to be searched next and a search target for which a search is to be made last in the previous search area. This makes it possible to perform a search upon eliminating the association between different directories when a search target point does not change.

Since a search target is a directory or file corresponding to a predetermined search condition, a search can be easily made for a search target matching a predetermined search condition.

In addition, since a search target is a directory or file for which a predetermined search condition changes, a search can be easily made for a search target for which a predetermined search condition changes.

Although the first to fourth embodiments have been described, they may be combined with each other.

Each embodiment described above has exemplified the case wherein the present invention is applied to a digital camera. However, the present invention may be implemented by an application program for a general information processing apparatus such as a personal computer which stores and manages image files sensed by a digital camera. In this case, it suffices to display a GUI which displays key images including the keys 450 to 454 in FIG. 4 as control items which can be designated with a pointing device.

Furthermore, in general, a computer program is stored in a computer-readable storage medium such as a CD-ROM, and can be executed by setting the storage medium in the read drive of the computer and copying or installing the program in the system. Obviously, therefore, such a computer-readable storage medium falls within the spirit and scope of the present invention.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-021821 filed on Jan. 28, 2005 and No. 2005-039521 filed on Feb. 16, 2005, which are hereby incorporated by reference herein in their entirety.

What is claimed is:

1. An information search apparatus which searches for a predetermined search target in a search area, comprising:

search target presence/absence management means for managing search target presence/absence information indicating whether a search target exists in the search area;

search target information management means for managing search target information in the search area;

determination means for determining on the basis of the search target presence/absence information whether a search target exists in the search area; and search means for searching for a search target on the basis of the search target information when said determination means determines that there is a search target.

2. The apparatus according to claim 1, wherein the search area is a directory and a file and comprises recording means for recording the directory and the file and the search target presence/absence information and/or the search target information, and the search target presence/absence information and/or the search target information are/is created by using information concerning the directory and/or the file recorded on said recording means.

3. The apparatus according to claim 2, wherein the search target presence/absence information and/or the search target information are/is written and read on and from said recording means in association with the directory and/or the file.

4. The apparatus according to claim 2, wherein the search target is a directory or file corresponding to predetermined search target information.

5. The apparatus according to claim 2, wherein the search target is a directory or file in which predetermined search target information changes.

6. The apparatus according to claim 1, wherein the search target is at least one of a photographing condition, a date, a time, a file format, a file attribute, and color information.

7. The apparatus according to claim 1, wherein
the search target presence/absence information has a search target for which a search is to be made first in the search area and a search target for which a search is to be made last in the search area, and
said determination means determines whether a search target is present, by comparing a search target for which a search is to be made first in a search area to be searched next with a search target for which a search is to be made last in a previous search area.

8. The apparatus according to claim 1, wherein the directory is a directory for storage of an image file conforming to the DCF standard.

9. An information search method of controlling a computer to search for a predetermined search target in a search area, comprising:
a search target presence/absence management step of using the computer to manage search target presence/absence information indicating whether a search target exists in the search area;
a search target information management step of using the computer to manage search target information in the search area;
a determination step of using the computer to determine on the basis of the search target presence/absence information whether a search target exists in the search area; and
a search step of using the computer to search for a search target on the basis of the search target information when it is determined in the determination step that there is a search target.

10. The method according to claim 9, wherein
the search area is a directory and a file and the directory and the file and the search target presence/absence information and/or the search target information are/is recorded on recording means, and
the search target presence/absence information and/or the search target information are/is created by using information concerning the directory and/or the file recorded on the recording means.

11. The method according to claim 10, wherein the search target is a directory or file corresponding to predetermined search target information.

12. The method according to claim 10, wherein the search target is a directory or file in which predetermined search target information changes.

13. The method according to claim 9, wherein the search target presence/absence information and/or the search target information are/is written and read on and from the recording means in association with the directory and/or the file.

14. The method according to claim 9, wherein the search target is at least one of a photographing condition, a date, a time, a file format, a file attribute, and color information.

15. The method according to claim 9, wherein
the search target presence/absence information has a search target for which a search is to be made first in the search area and a search target for which a search is to be made last in the search area, and
in the determination step, it is determined whether a search target is present, by comparing a search target for which a search is to be made first in a search area to be searched next with a search target for which a search is to be made last in a previous search area.

16. The method according to claim 9, wherein the directory is a directory for storage of an image file conforming to the DCF standard.

17. A non-transitory computer readable storage medium storing a computer-executable program, said computer-executable program being executable by a computer so as to control the computer to execute an information search method of searching for a predetermined search target in a search area, the method comprising:
a search target presence/absence management step of managing search target presence/absence information indicating whether a search target exists in the search area;
a search target information management step of managing search target information in the search area;
a determination step of determining on the basis of the search target presence/absence information whether a search target exists in the search area; and
a search step of searching for a search target on the basis of the search target information when it is determined in the determination step that there is a search target.

* * * * *